US011751197B2

(12) United States Patent
Yang et al.

(10) Patent No.: US 11,751,197 B2
(45) Date of Patent: Sep. 5, 2023

(54) ACTIVATION OF SEMI-PERSISTENT RESOURCES

(71) Applicant: QUALCOMM Incorporated, San Diego, CA (US)

(72) Inventors: Wei Yang, San Diego, CA (US); Sony Akkarakaran, Poway, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/144,992

(22) Filed: Jan. 8, 2021

(65) Prior Publication Data

US 2022/0225308 A1    Jul. 14, 2022

(51) Int. Cl.
*H04L 5/00* (2006.01)
*H04W 72/20* (2023.01)
*H04L 1/1812* (2023.01)
*H04W 72/0446* (2023.01)

(52) U.S. Cl.
CPC .......... *H04W 72/20* (2023.01); *H04L 1/1812* (2013.01); *H04L 5/0048* (2013.01); *H04W 72/0446* (2013.01)

(58) Field of Classification Search
CPC ......... H04W 72/0406; H04W 72/0446; H04W 72/042; H04L 1/1812; H04L 5/0048
See application file for complete search history.

(56) References Cited

U.S. PATENT DOCUMENTS

| 2018/0049225 A1* | 2/2018 | Lee | H04W 72/0426 |
| 2018/0139734 A1* | 5/2018 | Babaei | H04W 72/0406 |
| 2018/0255569 A1* | 9/2018 | Aiba | H04W 76/30 |

* cited by examiner

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a medium access control control channel (MAC-CE) that indicates one or more of a slot offset or a slot periodicity for a semi-persistent resource set. The UE may perform, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE. Numerous other aspects are described.

30 Claims, 8 Drawing Sheets

ACTIVATION OF SEMI-PERSISTENT RESOURCES

FIELD OF THE DISCLOSURE

Aspects of the present disclosure generally relate to wireless communication and to techniques and apparatuses for activation of semi-persistent resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a UE for wireless communication includes a memory and one or more processors operatively coupled to the memory, the memory and the one or more processors configured to: receive, from a base station, a medium access control control channel (MAC-CE) that indicates one or more of a slot offset or a slot periodicity for a semi-persistent resource set; and perform, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, a base station for wireless communication includes a memory and one or more processors operatively coupled to the memory, the memory and the one or more processors configured to: transmit, to a UE, a MAC-CE that indicates one or more of a slot offset or a slot periodicity for a semi-persistent resource set; and perform, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, a method of wireless communication performed by a UE includes receiving, from a base station, a MAC-CE that indicates one or more of a slot offset or a slot periodicity for a semi-persistent resource set; and performing, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, a method of wireless communication performed by a base station includes transmitting, to a UE, a MAC-CE that indicates one or more of a slot offset or a slot periodicity for a semi-persistent resource set; and performing, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, a non-transitory computer-readable medium storing a set of instructions for wireless communication includes one or more instructions that, when executed by one or more processors of a UE, cause the UE to: receive, from a base station, a MAC-CE that indicates one or more of a slot offset or a slot periodicity for a semi-persistent resource set; and perform, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, a non-transitory computer-readable medium storing a set of instructions for wireless communication includes one or more instructions that, when executed by one or more processors of a base station, cause the base station to: transmit, to a UE, a MAC-CE that indicates one or more of a slot offset or a slot periodicity for a semi-persistent resource set; and perform, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, an apparatus for wireless communication includes means for receiving, from a base station, a MAC-CE that indicates one or more of a slot offset or a slot periodicity for a semi-persistent resource set; and means for performing, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

In some aspects, an apparatus for wireless communication includes means for transmitting, to a UE, a MAC-CE that indicates one or more of a slot offset or a slot periodicity for a semi-persistent resource set; and means for performing, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
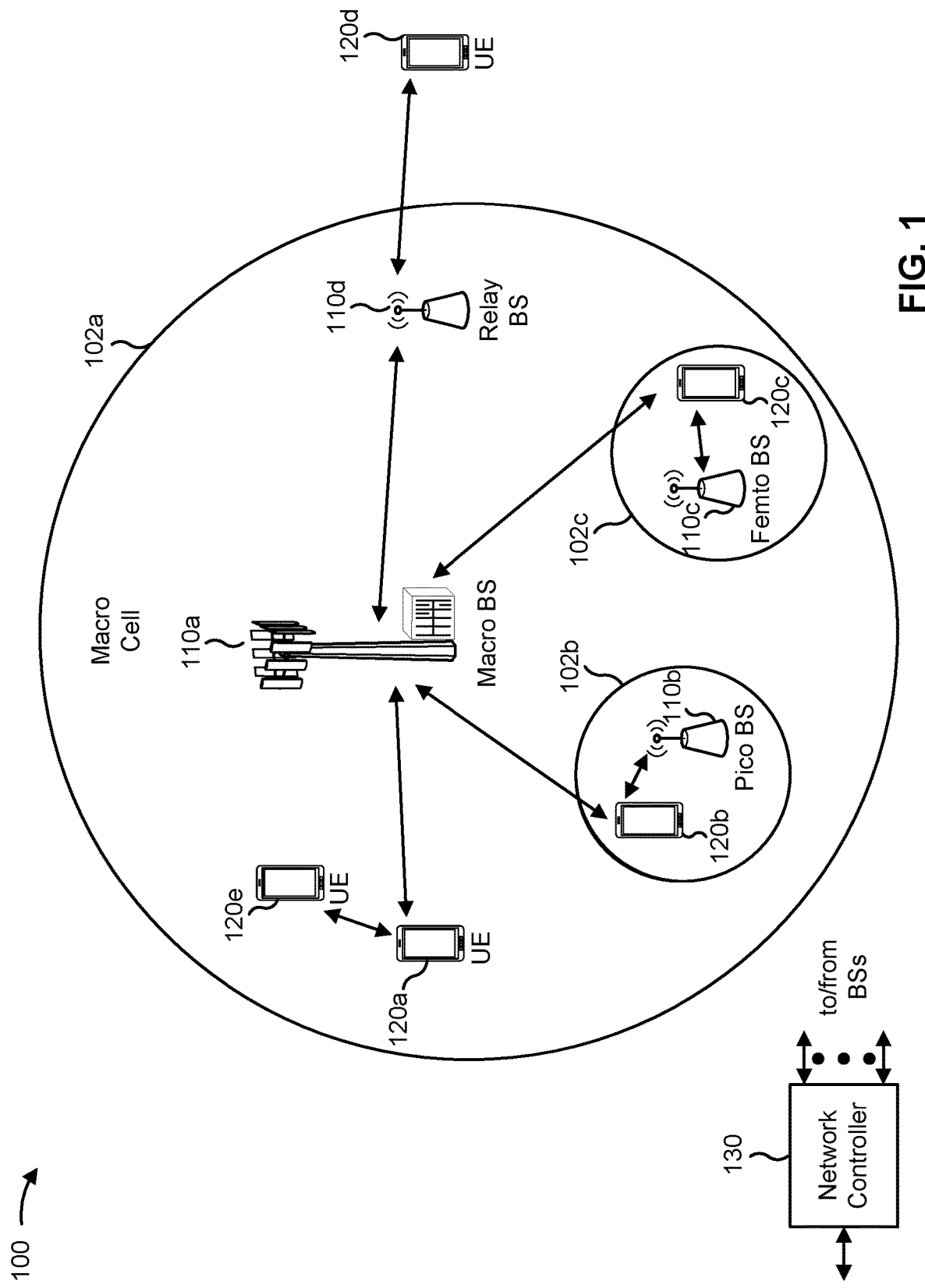
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
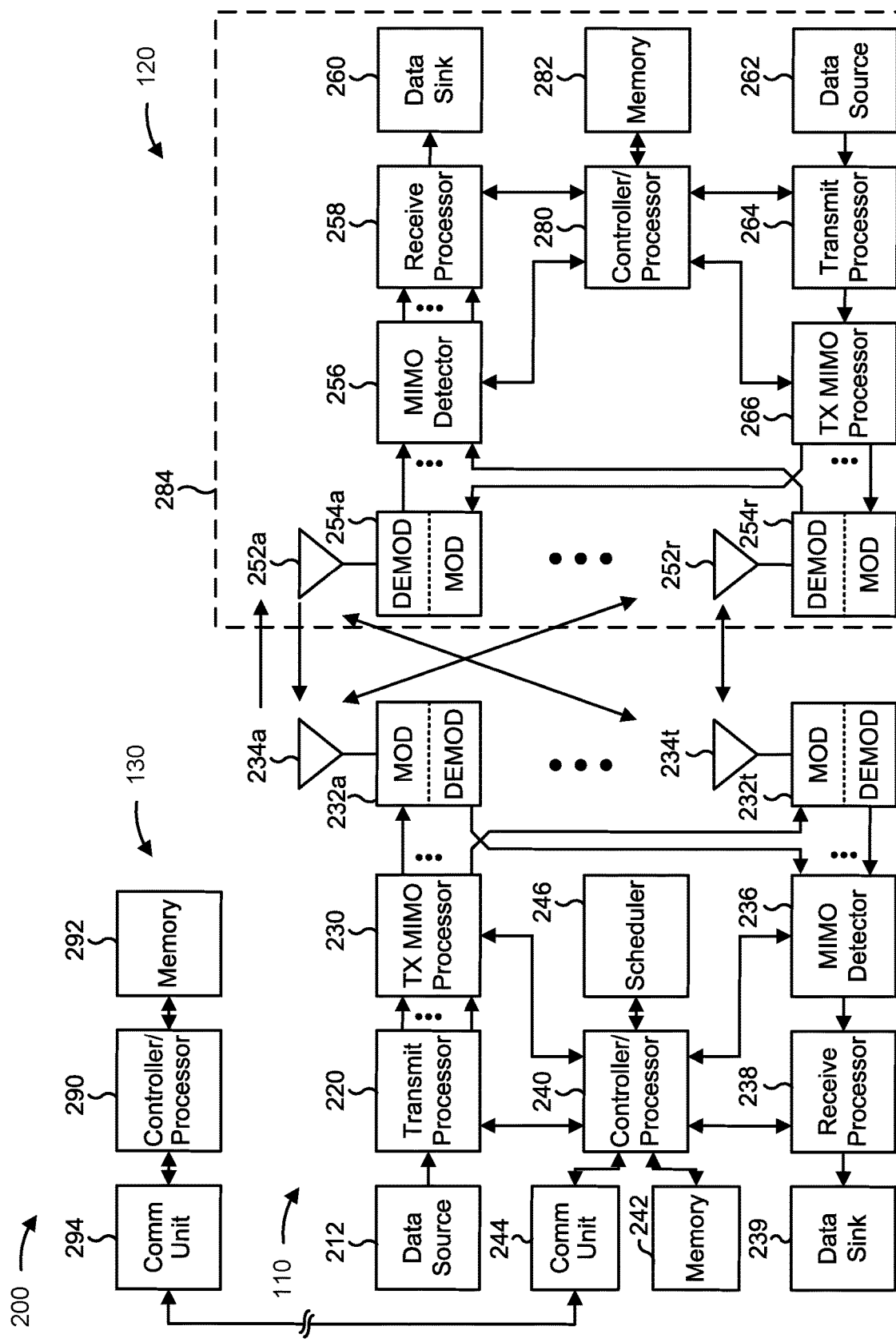
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with activation of semi-persistent resources, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving, from a base station, a MAC-CE that indicates one or more of a slot offset or a slot periodicity for a semi-persistent resource set; and/or means for performing, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving, from the base station, a configuration that indicates a plurality of slot offsets and a plurality of slot periodicities, wherein one or more of the slot offset or the slot periodicity indicated by the MAC-CE are included in the configuration.

In some aspects, the UE includes means for transmitting, to the base station, a hybrid automatic repeat request acknowledgement (HARQ-ACK) via a physical uplink control channel based at least in part on the MAC-CE received from the base station, wherein the slot offset is an offset to a reference slot in which the HARQ-ACK is transmitted to the base station.

In some aspects, the UE includes means for transmitting, to the base station, a HARQ-ACK via a physical uplink control channel based at least in part on the MAC-CE received from the base station, wherein the slot offset is an offset to a reference slot associated with a transmission of the HARQ-ACK and a delay, and wherein the delay is based at least in part on a number of slots included in a subframe.

In some aspects, the base station includes means for transmitting, to a UE, a MAC-CE that indicates one or more of a slot offset or a slot periodicity for a semi-persistent resource set; and/or means for performing, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A base station may schedule a UE to transmit a semi-persistent (SP) sounding reference signal (SRS) or an SP channel state information (CSI) report on a physical uplink control channel (PUCCH). The UE may be scheduled, by the base station, to transmit the SP SRS or the SP CSI report to the base station via the PUCCH. The base station may also schedule the UE to receive an SP CSI-RS or an SP channel state information interference measurement (CSI-IM) via a MAC-CE activation and deactivation. The UE may be scheduled, by the base station, to receive the SP CSI-RS/CSI-IM from the base station via the MAC-CE activation and deactivation.

A slot in which the UE transmits/receives these channels/signals (e.g., SP SRS, SP CSI report, or SP CSI-RS/CSI-IM) may be fixed based at least in part on a radio resource control (RRC) configuration. The RRC configuration may define a periodicity and an offset with respect to slot 0 and system frame number (SFN) 0, which may fix the slot in which the UE transmits/receives the channels/signals.

An SRS resource set may include a plurality of SRS resources. The UE may transmit the SRS resource set in an aperiodic manner (e.g., based at least in part on downlink control information (DCI) signaling), in an SP manner, or in a periodic manner. The UE may be configured with multiple resources, which may be grouped into the SRS resource set based at least in part on an SRS use case, such as antenna switching, codebook-based communications, non-codebook based communications, or beam management.

For an SP-SRS resource, the UE may be configured with an RRC parameter (periodicityAndOffset-sp) to indicate a periodicity and a slot offset of the SP-SRS resource. The base station may transmit a MAC-CE to activate and/or deactivate a corresponding SRS resource set that includes SP SRS resources for a given SRS use case.

A CSI-RS/CSI-IM resource set may include a plurality of CSI-RS and/or CSI-IM resources, for which the UE may measure channel/interference conditions on a corresponding downlink bandwidth part (BWP) of a downlink cell. The base station may transmit the CSI-RS/CSI-IM resource set in an aperiodic manner (e.g., based at least in part on DCI signaling), in an SP manner, or in a periodic manner.

For a CSI-RS/CSI-IM resource, the UE may be configured with an RRC parameter (periodicityAndOffset) to indicate a periodicity and a slot offset of the CSI-RS/CSI-IM. The base station may transmit a MAC-CE to activate and/or deactivate a corresponding CSI-RS/CSI-IM resource set that includes the CSI-RS/CSI-IM resources. One MAC-CE may activate both CSI-RS and CSI-IM resource sets.

The UE may transmit, to the base station, a CSI report based at least in part on receiving a CSI-RS/CSI-IM from the base station. The UE may transmit the CSI via the PUCCH or a physical uplink shared channel (PUSCH). The CSI report may be scheduled in an aperiodic manner (e.g., an aperiodic CSI report may be triggered based at least in part on DCI). The CSI report may be scheduled in an SP manner on the PUSCH (e.g., an SP CSI report may be activated/deactivated by DCI). The CSI report may be scheduled in an SP manner on the PUCCH (e.g., an SP CSI report may be activated/deactivated by a MAC-CE). The CSI report may be scheduled in a periodic manner (e.g., a periodic CSI report may be scheduled via an RRC configuration).

For an SP CSI report configured to be transmitted via the PUCCH, the UE may be configured with an RRC parameter (periodicityAndOffset) to indicate a periodicity and a slot offset of the SP CSI report on a corresponding PUCCH resource. The base station may transmit a MAC-CE to activate and/or deactivate a corresponding SP CSI report for a given downlink BWP of a serving cell.

The base station may schedule the UE to transmit an SP SRS or an SP CSI report on a PUCCH, and/or the base station may schedule the UE to receive an SP CSI-RS/CSI-IM via a MAC-CE activation and deactivation. However, the slots in which the UE transmits/receives these channels/signals are fixed based at least in part on an RRC configuration with periodicity and offset parameters. Fixed slots to transmit/receive the channels/signals may provide reduced flexibility for the UE. For example, the UE may be constrained to transmit/receive the channels/signals based at least in part on the RRC configuration with the periodicity and offset parameters, as received from the base station.

In various aspects of techniques and apparatuses described herein, a UE may receive, from a base station, a MAC-CE that indicates a slot offset and/or a slot periodicity for an SP resource set. The UE may perform, with the base station, a communication at a slot associated with an SP resource of the SP resource set based at least in part on the slot offset and/or the slot periodicity. The SP resource associated with the slot may be activated based at least in part on the MAC-CE. In some aspects, the SP resource set may be associated with an SP SRS resource set, and the communication may be an SRS transmission to the base station. In some aspects, the SP resource set may be associated with a CSI-RS resource set or a CSI-IM resource set, and the communication may be a CSI-RS reception from the base station or a CSI-IM reception from the base station. In some aspects, the SP resource set may be associated with a PUCCH resource, and the communication may be a CSI report transmission via the PUCCH resource. The slot at which the UE may receive or transmit signals/channels may be flexibly configured via the MAC-CE, as opposed to being configured in a fixed manner. In other words, the MAC-CE may include a flexible slot offset indication, which may offer the UE greater flexibility when performing communications with the base station on SP resources.

Figure 3:
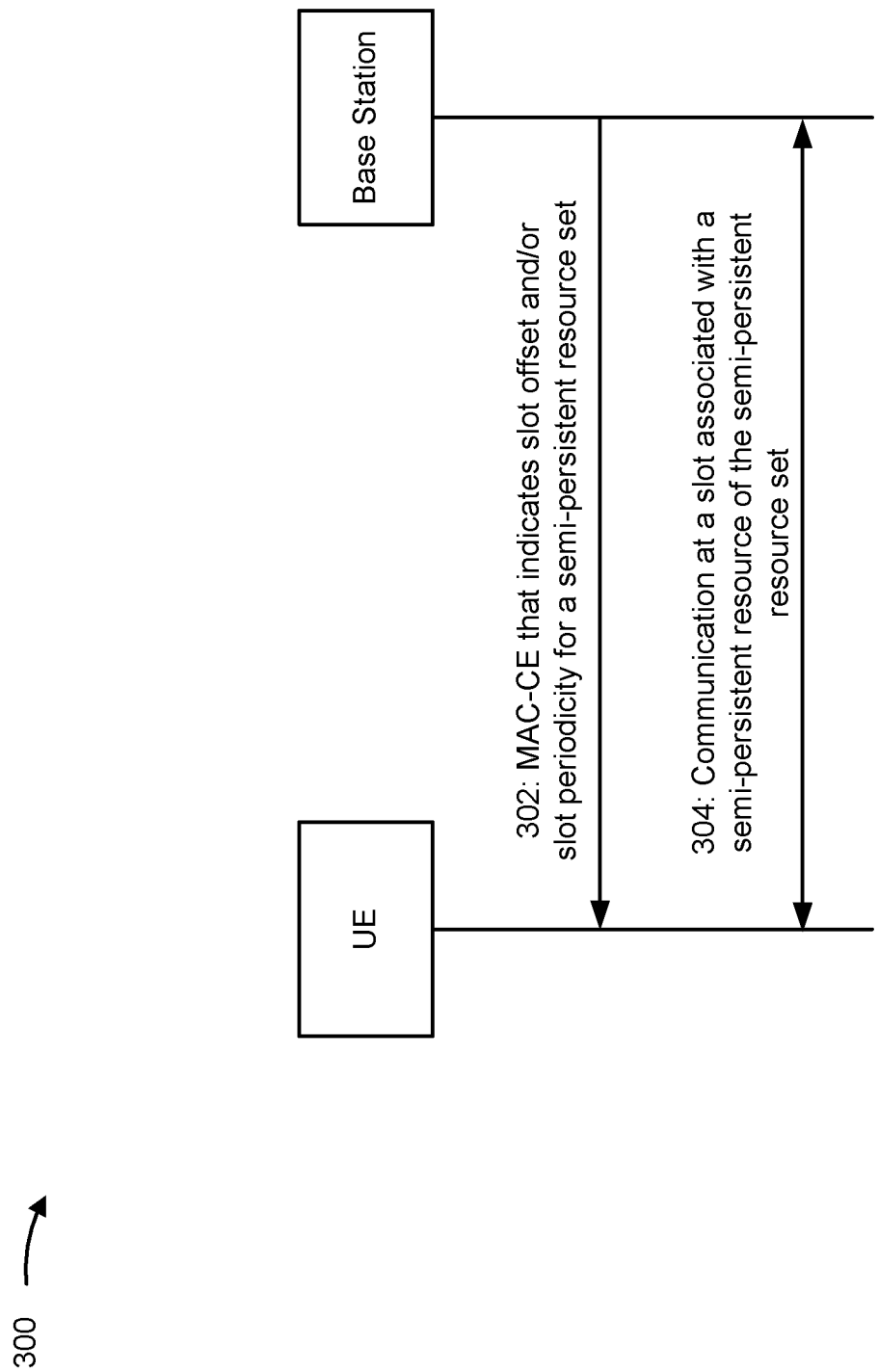
FIGS. 3-4 are diagrams illustrating examples associated with activation of semi-persistent resources, in accordance with various aspects of the present disclosure.

FIG. 3 is a diagram illustrating an example 300 associated with activation of semi-persistent resources, in accordance with various aspects of the present disclosure. As shown in FIG. 3, example 700 includes communication between a UE (e.g., UE 120a) and a base station (e.g., base station 110). In some aspects, the UE and the base station may be included in a wireless network such as wireless network 100.

As shown by reference number 302, the UE may receive, from the base station, a MAC-CE that indicates a slot offset and/or a slot periodicity for an SP resource set. The UE may receive the MAC-CE via a physical downlink shared channel (PDSCH). The MAC-CE may activate or deactivate an SP resource of the SP resource set. The SP resource of the SP resource set may be indicated based at least in part on the slot offset and/or the slot periodicity, as indicated in the MAC-CE. The MAC-CE received from the base station may be the MAC-CE used to activate or deactivate the resource in the SP resource set. In other words, the slot offset and/or the slot periodicity may be added to the MAC-CE used for SP resource activation. In some aspects, the SP resource set may be associated with an SP SRS resource set. In some aspects, the SP resource set may be associated with a CSI-RS resource set or a CSI-IM resource set. In some aspects, the SP resource set may be associated with a PUCCH resource, which may be used to transmit a CSI report. In other words, the MAC-CE may indicate a slot offset and/or a slot periodicity for an SP SRS resource set, an SP CSI-RS/CSI-IM resource set, or a CSI report on a PUCCH.

In some aspects, the UE may receive, from the base station, a configuration that indicates a plurality of slot offsets and a plurality of slot periodicities. The slot offset and/or the slot periodicity indicated by the MAC-CE may be included in the configuration. In other words, the UE may be preconfigured with a list of slot offset values, and the MAC-CE may indicate a selection of a slot offset value from the list of slot offset values.

In some aspects, the slot offset and/or the slot periodicity indicated by the MAC-CE may be an update to a previously received slot offset and/or a previously received slot periodicity. In other words, the MAC-CE may indicate to the UE a new slot periodicity value and/or a new slot offset value.

In some aspects, the MAC-CE may indicate the slot offset for each SP resource included in an SP resource set, where the SP resource may be associated with an SP SRS resource, or a CSI-RS/CSI-IM resource. For example, the MAC-CE may indicate, for each of an SP SRS resource in an SP SRS resource set and/or each of a CSI-RS/CSI-IM resource in an SP CSI-RS/CSI-IM resource set, a corresponding slot offset. The MAC-CE may include N slot offsets for an activated SP resource set, where N represents a number of SP resources in the activated SP resource set.

In some aspects, the slot offset indicated in the MAC-CE may be with respect to a reference slot (or reference point). The slot offset may be an offset to the reference slot. The slot offset may be a defined number of slots after the reference slot.

In some aspects, the reference slot may be associated with a slot in which the MAC-CE is received from the base station. For example, a slot in which the UE transmits/receives a signal may be slot n+d, where the MAC-CE is received at the UE in slot n and d represents the slot offset. The signal may be an SRS, a CSI-RS/CSI-IM, or a CSI report. The slot n+d may be a slot in which the UE transmits/receives a first instance of an SP resource. In other words, the slot n+d may be a slot in which the UE transmits/receives the SP resources, and the UE transmits/receives in subsequent slots according to the configured/indicated periodicity.

In some aspects, the UE may transmit, to the base station, a HARQ-ACK via a PUCCH based at least in part on the MAC-CE received from the base station. For example, the UE may successfully receive the MAC-CE, and transmit the HARQ-ACK based at least in part on the successful reception of the MAC CE. The reference slot may be associated with a slot in which the HARQ-ACK is transmitted to the base station. For example, a slot in which the UE transmits/receives a signal may be slot n'+d, where n' is a slot in which the UE transmits a PUCCH with the HARQ-ACK based at least in part on a receipt of the PDSCH that includes an activation MAC-CE, and d represents the slot offset. The signal may be an SRS, a CSI-RS/CSI-IM, or a CSI report.

In some aspects, the UE may transmit, to the base station, a HARQ-ACK via a PUCCH based at least in part on the MAC-CE received from the base station. The reference slot may be associated with a slot in which the HARQ-ACK is transmitted to the base station, and the reference slot may be based at least in part on a delay. The delay may be based at least in part on a number of slots included in a subframe.

As an example, a slot in which the UE transmits/receives a signal may be a delay (e.g., 3 ms) after a slot in which the HARQ-ACK corresponding to the MAC-CE is transmitted to the base station. The reference slot may be $n'+3 N_{slot}^{subframe}$, where n' is the slot in which the UE transmits a PUCCH with the HARQ-ACK for a PDSCH providing the MAC-CE, and $N_{slot}^{subframe}$ represents the number of slots contained in one ms (e.g., one subframe). In this example, a slot in which the UE transmits/receives a signal may be slot $n'+3N_{slot}^{subframe}+d$. The signal may be an SRS, a CSI-RS/CSI-IM, or a CSI report.

In some aspects, the slot offset may include uplink slots and downlink slots. As an example, the slot offset (d) may be a dth slot after the reference slot (or reference point), and the dth slot may include both uplink slots and downlink slots. In some aspects, the dth slot may include only uplink slots. In some aspects, the dth slot may include only downlink slots. In other words, when the SP resource is associated with an SRS or CSI reports on the PUCCH, the offset may include only uplink slots. When the SP resource is associated with a CSI-IM or CSI-RS resource, the dth slot may include the downlink slot.

In some aspects, the dth slot may include only slots available for transmissions or reception of signals (e.g., only uplink slots for the SRS and CSI report on the PUCCH, and only downlink slots for CSI-RS and CSI-IM reception). However, when a slot includes both uplink and downlink symbols, the UE may also count this slot, as long as OFDM symbols on which the signals/channels (e.g., SRS, CSI report on PUCCH, CSI-RS, CSI-IM) are uplink (or respectively, downlink).

In some aspects, the MAC-CE may activate or deactivate a subset of semi-persistent resources in the SP resource set. For example, the MAC-CE may activate or deactivate a subset of SP SRS resources, a subset of CSI-RS resources, a subset of CSI-IM resources in a corresponding SRS resource set, a subset of a CSI-RS resource set, and/or a subset of a CSI-IM resource set. The MAC-CE may activate or deactivate sub-sets of SP resources in the SP resource set, as opposed to activating or deactivating all SRS resources in the SRS resource set or all CSI-RS/CSI-IM resources in the CSI-RS/CSI-IM resource set at a same time.

As shown by reference number 304, the UE may perform, with the base station, a communication at a slot associated with an SP resource of the semi-persistent resource set based at least in part on the slot offset and/or the slot periodicity. The SP resource associated with the slot may be activated based at least in part on the MAC-CE. In some aspects, the communication may be associated with an SRS transmission from the UE to the base station. In some aspects, the communication may be associated with a CSI-RS reception at the UE from the base station or a CSI-IM reception from the base station. In some aspects, the communication may be associated with a transmission of a CSI report from the UE to the base station via the PUCCH resource.

As indicated above, FIG. 3 is provided as an example. Other examples may differ from what is described with regard to FIG. 3.

Figure 4:
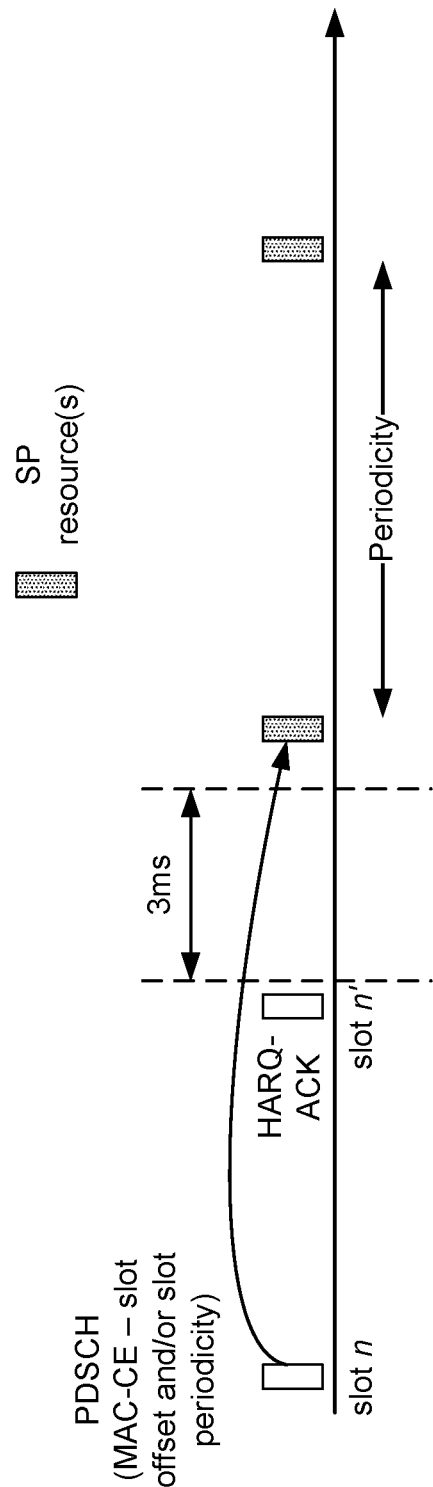

FIG. 4 is a diagram illustrating an example 400 associated with activation of semi-persistent resources, in accordance with various aspects of the present disclosure.

As shown in FIG. 3, a UE may receive a MAC-CE from a base station. The UE may receive the MAC-CE via a PDSCH. The UE may receive the MAC-CE in slot n. The MAC-CE may indicate a slot offset and/or a slot periodicity for an SP resource set. The SP resource set may include one or more SP resources in accordance with the slot offset and/or the slot periodicity. The UE may successfully receive the MAC-CE, and the UE may transmit a HARQ-ACK to the base station based at least in part on the MAC-CE received at the UE. The UE may transmit the HARQ-ACK at slot n' via a PUCCH.

In some aspects, the MAC-CE may be associated with an activation command that is applied after the UE transmits the PUCCH by a defined duration. As an example, the defined duration may be 3 ms. In other words, in this example, the MAC-CE may be associated with an activation command that is applied 3 ms after the UE transmits the PUCCH, which may include the HARQ-ACK for a corresponding PDSCH that includes the MAC-CE. Further, in this example, a transmission/reception at the UE may start at least 3 ms after the UE transmits the HARQ-ACK to the base station via the PUCCH, and transmissions/receptions may not occur at the UE at occasions spanning the duration of at least 3 ms between the HARQ-ACK transmission and an SP resource.

As indicated above, FIG. 4 is provided as an example. Other examples may differ from what is described with regard to FIG. 4.

Figure 5:
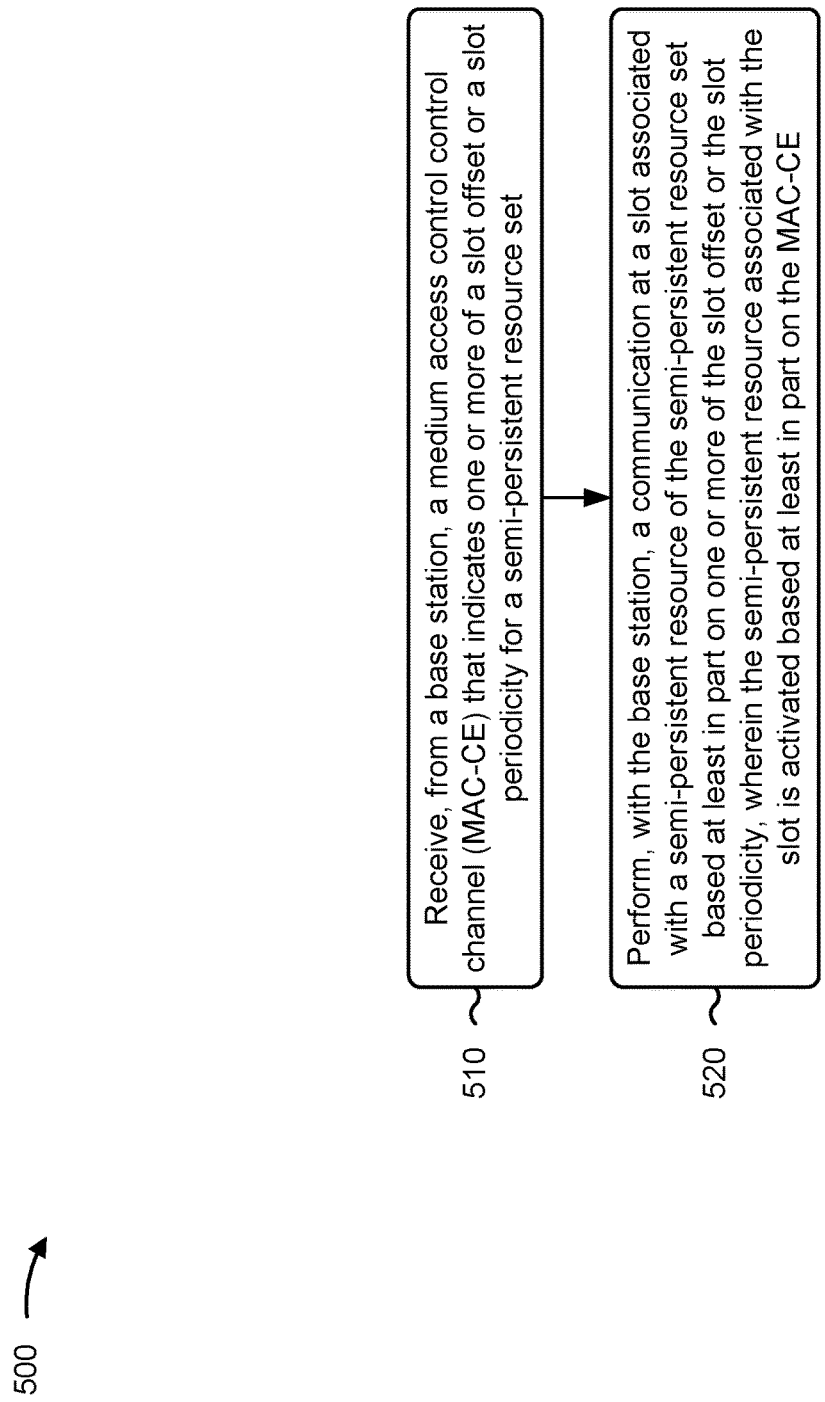
FIGS. 5-6 are diagrams illustrating example processes associated with activation of semi-persistent resources, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with activation of semi-persistent resources.

As shown in FIG. 5, in some aspects, process 500 may include receiving, from a base station, a MAC-CE that indicates one or more of a slot offset or a slot periodicity for a semi-persistent resource set (block 510). For example, the UE (e.g., using reception component 702, depicted in FIG. 7) may receive, from a base station, a MAC-CE that indicates one or more of a slot offset or a slot periodicity for a semi-persistent resource set, as described above.

As further shown in FIG. 5, in some aspects, process 500 may include performing, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE (block 520). For example, the UE (e.g., using reception component 702 and/or transmission component 704, depicted in FIG. 7) may perform, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE, as described above.

Process 500 may include additional aspects, such as any single aspect or any combination of aspects described below and/or in connection with one or more other processes described elsewhere herein.

In a first aspect, the semi-persistent resource set is associated with a semi-persistent SRS resource set, and the communication is associated with an SRS transmission to the base station.

In a second aspect, alone or in combination with the first aspect, the semi-persistent resource set is associated with a CSI-RS resource set or a CSI-IM resource set, and the communication is associated with a CSI-RS reception from the base station or a CSI-IM reception from the base station.

In a third aspect, alone or in combination with one or more of the first and second aspects, the semi-persistent resource set is associated with a PUCCH resource, and the communication is associated with a transmission of a channel state information report to the base station via the PUCCH resource.

In a fourth aspect, alone or in combination with one or more of the first through third aspects, process 500 includes receiving, from the base station, a configuration that indicates a plurality of slot offsets and a plurality of slot periodicities, wherein one or more of the slot offset or the slot periodicity indicated by the MAC-CE are included in the configuration.

In a fifth aspect, alone or in combination with one or more of the first through fourth aspects, one or more of the slot offset or the slot periodicity is an update to one or more of a previously received slot offset or a previously received slot periodicity.

In a sixth aspect, alone or in combination with one or more of the first through fifth aspects, the MAC-CE indicates the slot offset for each semi-persistent resource included in the semi-persistent resource set, wherein the semi-persistent resource corresponds to a semi-persistent sounding reference signal (SRS) resource, a channel state information reference signal (CSI-RS) resource, or a channel state information interference measurement (CSI-IM) resource.

In a seventh aspect, alone or in combination with one or more of the first through sixth aspects, the slot offset is an offset to a reference slot in which the MAC-CE is received from the base station.

In an eighth aspect, alone or in combination with one or more of the first through seventh aspects, process 500 includes transmitting, to the base station, a HARQ-ACK via a physical uplink control channel based at least in part on the MAC-CE received from the base station, wherein the slot offset is an offset to a reference slot in which the HARQ-ACK is transmitted to the base station.

In a ninth aspect, alone or in combination with one or more of the first through eighth aspects, process 500 includes transmitting, to the base station, a HARQ-ACK via a physical uplink control channel based at least in part on the MAC-CE received from the base station, wherein the slot offset is an offset to a reference slot associated with a transmission of the HARQ-ACK and a delay, and wherein the delay is based at least in part on a number of slots included in a subframe.

In a tenth aspect, alone or in combination with one or more of the first through ninth aspects, the slot offset includes uplink slots and downlink slots.

In an eleventh aspect, alone or in combination with one or more of the first through tenth aspects, the slot offset includes uplink slots.

In a twelfth aspect, alone or in combination with one or more of the first through eleventh aspects, the MAC-CE activates or deactivates a subset of semi-persistent resources in the semi-persistent resource set.

In a thirteenth aspect, alone or in combination with one or more of the first through twelfth aspects, the MAC-CE is received via a physical downlink shared channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
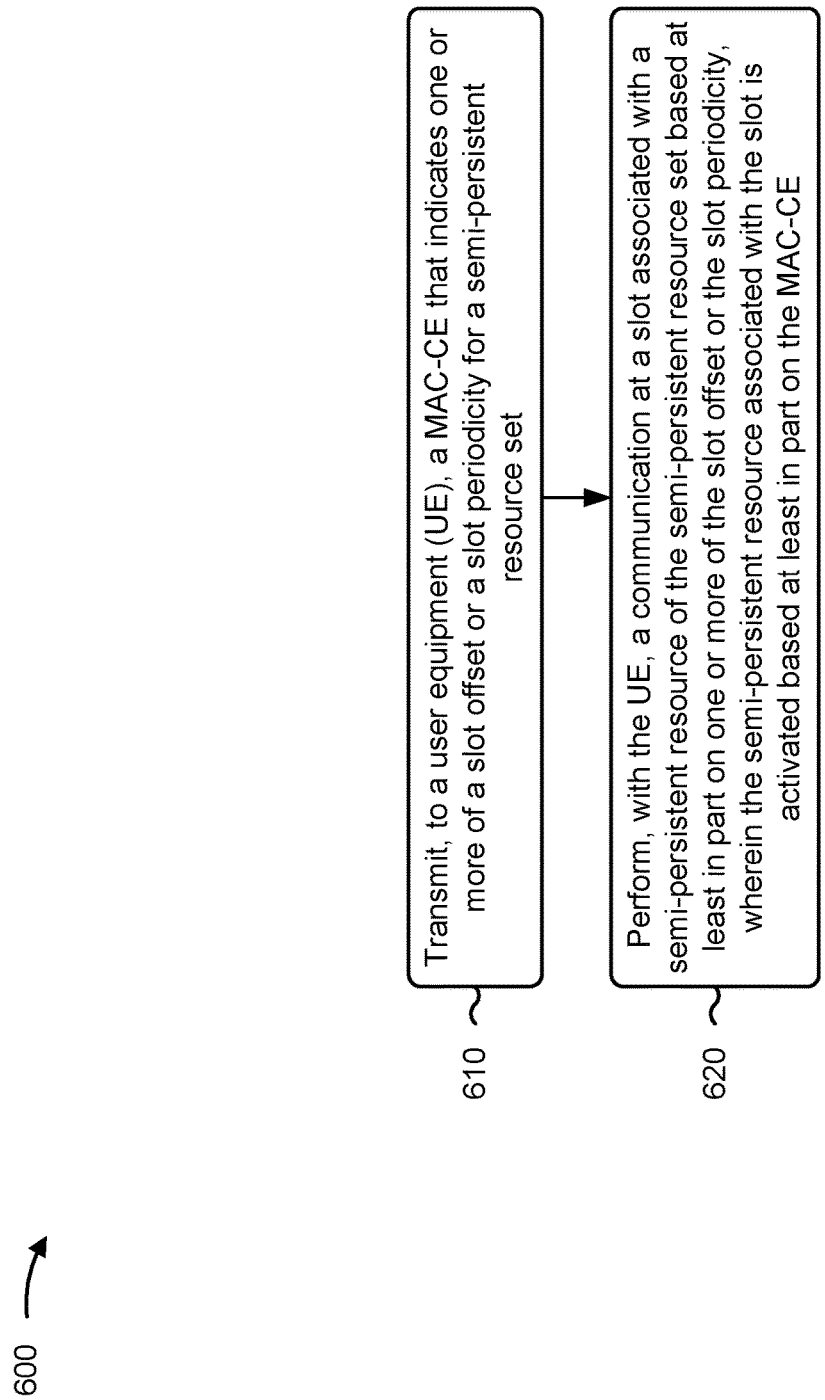

FIG. 6 is a diagram illustrating an example process 600 performed, for example, by a base station, in accordance with various aspects of the present disclosure. Example process 600 is an example where the base station (e.g., base station 110) performs operations associated with activation of semi-persistent resources.

As shown in FIG. 6, in some aspects, process 600 may include transmitting, to a UE, a MAC-CE that indicates one or more of a slot offset or a slot periodicity for a semi-persistent resource set (block 610). For example, the base station (e.g., using transmission component 804, depicted in FIG. 8) may transmit, to a UE, a MAC-CE that indicates one or more of a slot offset or a slot periodicity for a semi-persistent resource set, as described above.

As further shown in FIG. 6, in some aspects, process 600 may include performing, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE (block 620). For example, the base station (e.g., using reception component 802 and/or transmission component 804, depicted in FIG. 8) may perform, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE, as described above.

Process 600 may include additional aspects, such as any single aspect or any combination of aspects described below and/or in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
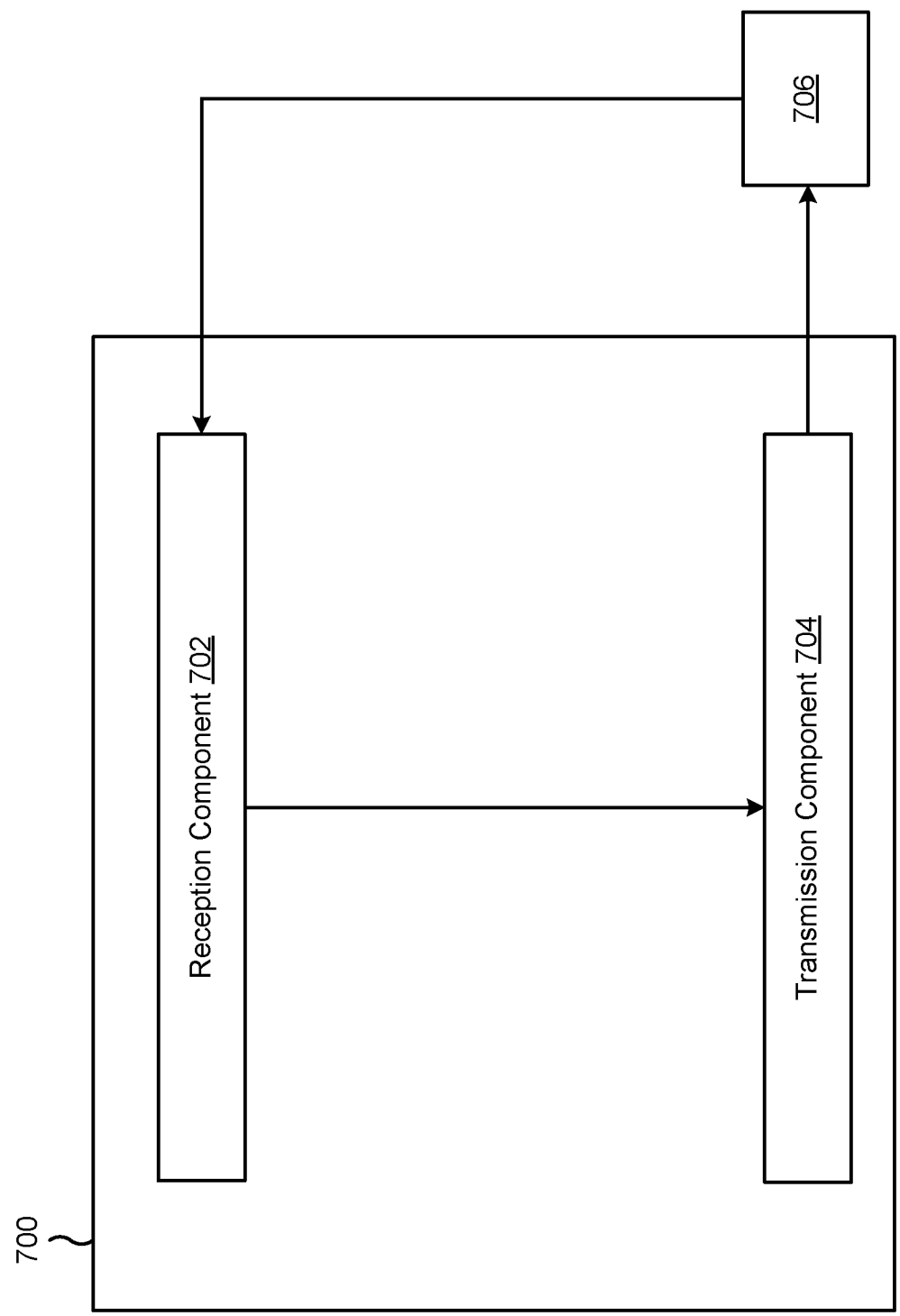
FIGS. 7-8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, from a base station, a MAC-CE that indicates one or more of a slot offset or a slot periodicity for a semi-persistent resource set. The reception component 702 and/or the transmission component 704 may perform, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

The reception component 702 may receive, from the base station, a configuration that indicates a plurality of slot offsets and a plurality of slot periodicities, wherein one or more of the slot offset or the slot periodicity indicated by the MAC-CE are included in the configuration.

The transmission component 704 may transmit, to the base station, a HARQ-ACK via a physical uplink control channel based at least in part on the MAC-CE received from the base station, wherein the slot offset is an offset to a reference slot in which the HARQ-ACK is transmitted to the base station.

The transmission component 704 may transmit, to the base station, a HARQ-ACK via a physical uplink control channel based at least in part on the MAC-CE received from the base station, wherein the slot offset is an offset to a reference slot associated with a transmission of the HARQ-ACK and a delay, and wherein the delay is based at least in part on a number of slots included in a subframe.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
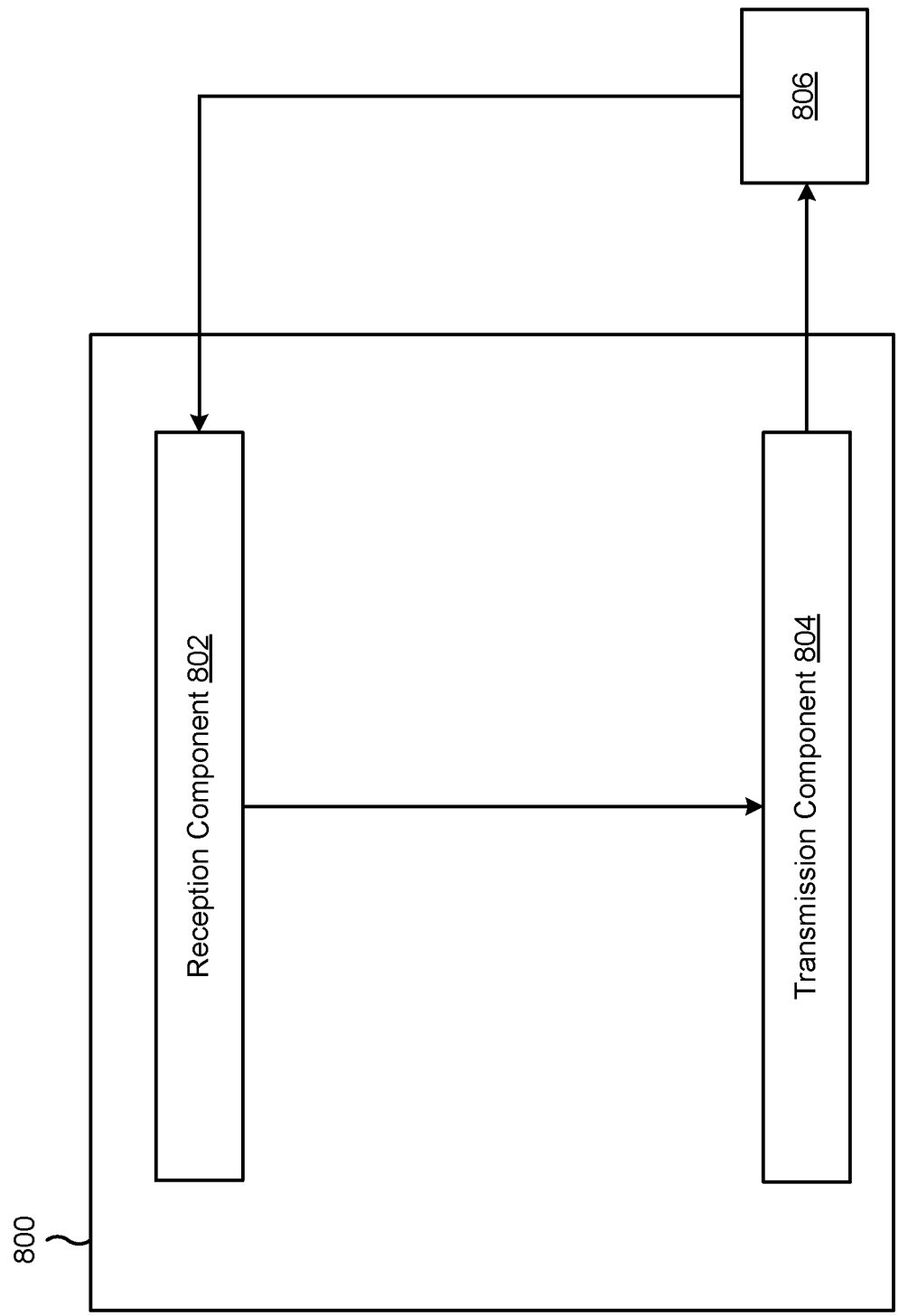

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6 In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit, to a UE, a MAC-CE that indicates one or more of a slot offset or a slot periodicity for a semi-persistent resource set. The reception component 802 and/or the transmission component 804 may perform, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: receiving, from a base station, a medium access control control channel (MAC-CE) that indicates one or more of a slot offset or a slot periodicity for a semi-persistent resource set; and performing, with the base station, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

Aspect 2: The method of aspect 1, wherein the semi-persistent resource set is associated with a semi-persistent sounding reference signal (SRS) resource set, and wherein the communication is associated with an SRS transmission to the base station.

Aspect 3: The method of any of aspects 1 through 2, wherein the semi-persistent resource set is associated with a channel state information reference signal (CSI-RS) resource set or a channel state information interference measurement (CSI-IM) resource set, and wherein the communication is associated with a CSI-RS reception from the base station or a CSI-IM reception from the base station.

Aspect 4: The method of any of aspects 1 through 3, wherein the semi-persistent resource set is associated with a physical uplink control channel (PUCCH) resource, and wherein the communication is associated with a transmission of a channel state information report to the base station via the PUCCH resource.

Aspect 5: The method of any of aspects 1 through 4, further comprising: receiving, from the base station, a configuration that indicates a plurality of slot offsets and a plurality of slot periodicities, wherein one or more of the slot offset or the slot periodicity indicated by the MAC-CE are included in the configuration.

Aspect 6: The method of any of aspects 1 through 5, wherein one or more of the slot offset or the slot periodicity is an update to one or more of a previously received slot offset or a previously received slot periodicity.

Aspect 7: The method of any of aspects 1 through 6, wherein the MAC-CE indicates the slot offset for each semi-persistent resource included in the semi-persistent resource set, wherein the semi-persistent resource corresponds to a semi-persistent sounding reference signal (SRS) resource, a channel state information reference signal (CSI-RS) resource, or a channel state information interference measurement (CSI-IM) resource.

Aspect 8: The method of any of aspects 1 through 7, wherein the slot offset is an offset to a reference slot in which the MAC-CE is received from the base station.

Aspect 9: The method of any of aspects 1 through 8, further comprising: transmitting, to the base station, a hybrid automatic repeat request acknowledgement (HARQ-ACK) via a physical uplink control channel based at least in part on the MAC-CE received from the base station, wherein the slot offset is an offset to a reference slot in which the HARQ-ACK is transmitted to the base station.

Aspect 10: The method of any of aspects 1 through 9, further comprising: transmitting, to the base station, a hybrid automatic repeat request acknowledgement (HARQ-ACK) via a physical uplink control channel based at least in part on the MAC-CE received from the base station, wherein the slot offset is an offset to a reference slot associated with a transmission of the HARQ-ACK and a delay, and wherein the delay is based at least in part on a number of slots included in a subframe.

Aspect 11: The method of any of aspects 1 through 10, wherein the slot offset includes uplink slots and downlink slots.

Aspect 12: The method of any of aspects 1 through 11, wherein the slot offset includes uplink slots.

Aspect 13: The method of any of aspects 1 through 12, wherein the MAC-CE activates or deactivates a subset of semi-persistent resources in the semi-persistent resource set.

Aspect 14: The method of any of aspects 1 through 13, wherein the MAC-CE is received via a physical downlink shared channel.

Aspect 15: A method of wireless communication performed by a base station, comprising: transmitting, to a user equipment (UE), a medium access control control channel (MAC-CE) that indicates one or more of a slot offset or a slot periodicity for a semi-persistent resource set; and performing, with the UE, a communication at a slot associated with a semi-persistent resource of the semi-persistent resource set based at least in part on one or more of the slot offset or the slot periodicity, wherein the semi-persistent resource associated with the slot is activated based at least in part on the MAC-CE.

Aspect 16: An apparatus for wireless communication at a device, comprising a processor; memory coupled with the processor; and instructions stored in the memory and executable by the processor to cause the apparatus to perform the method of one or more aspects of aspects 1-14.

Aspect 17: A device for wireless communication, comprising a memory and one or more processors coupled to the memory, the memory and the one or more processors configured to perform the method of one or more aspects of aspects 1-14.

Aspect 18: An apparatus for wireless communication, comprising at least one means for performing the method of one or more aspects of aspects 1-14.

Aspect 19: A non-transitory computer-readable medium storing code for wireless communication, the code comprising instructions executable by a processor to perform the method of one or more aspects of aspects 1-14.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-14.

Aspect 21: An apparatus for wireless communication at a device, comprising a processor; memory coupled with the processor; and instructions stored in the memory and executable by the processor to cause the apparatus to perform the method of aspect 15.

Aspect 22: A device for wireless communication, comprising a memory and one or more processors coupled to the memory, the memory and the one or more processors configured to perform the method of aspect 15.

Aspect 23: An apparatus for wireless communication, comprising at least one means for performing the method of aspect 15.

Aspect 24: A non-transitory computer-readable medium storing code for wireless communication, the code comprising instructions executable by a processor to perform the method of aspect 15.

Aspect 25: A non-transitory computer-readable medium storing a set of instructions for wireless communication, the set of instructions comprising one or more instructions that, when executed by one or more processors of a device, cause the device to perform the method of aspect 15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors coupled to the memory, the one or more processors configured to:

receive, via a physical downlink shared channel from a network entity, a medium access control control channel (MAC-CE) that indicates one or more of a slot offset or a slot periodicity for a semi-persistent resource set, wherein one or more of the slot offset or the slot periodicity is based at least in part on a first slot in which the MAC-CE is received from the network entity; and perform, with the network entity, a communication at a second slot associated with a semi-persistent resource of the semi-persistent resource set based at least in part on one or more of the slot offset or the slot periodicity, wherein the semi-persistent resource associated with the second slot is activated based at least in part on the MAC-CE.

2. The UE of claim 1, wherein the semi-persistent resource set is associated with a semi-persistent sounding reference signal (SRS) resource set, and wherein the communication is associated with an SRS transmission to the network entity.

3. The UE of claim 1, wherein the semi-persistent resource set is associated with a channel state information reference signal (CSI-RS) resource set or a channel state information interference measurement (CSI-IM) resource set, and wherein the communication is associated with a CSI-RS reception from the network entity or a CSI-IM reception from the network entity.

4. The UE of claim 1, wherein the semi-persistent resource set is associated with a physical uplink control channel (PUCCH) resource, and wherein the communication is associated with a transmission of a channel state information report to the network entity via the PUCCH resource.

5. The UE of claim 1, wherein the one or more processors are further configured to:
receive, from the network entity, a configuration that indicates a plurality of slot offsets and a plurality of slot periodicities, wherein one or more of the slot offset or the slot periodicity indicated by the MAC-CE are included in the configuration.

6. The UE of claim 1, wherein one or more of the slot offset or the slot periodicity is an update to one or more of a previously received slot offset or a previously received slot periodicity.

7. The UE of claim 1, wherein the MAC-CE indicates the slot offset for each semi-persistent resource included in the semi-persistent resource set, wherein the semi-persistent resource corresponds to a semi-persistent sounding reference signal (SRS) resource, a channel state information reference signal (CSI-RS) resource, or a channel state information interference measurement (CSI-IM) resource.

8. The UE of claim 1, wherein the slot offset is an offset to the first slot in which the MAC-CE is received from the network entity.

9. The UE of claim 1, wherein the one or more processors are further configured to:
transmit, to the network entity, a hybrid automatic repeat request acknowledgement (HARQ-ACK) via a physical uplink control channel based at least in part on the MAC-CE received from the network entity, wherein the slot offset is an offset to a reference slot in which the HARQ-ACK is transmitted to the network entity.

10. The UE of claim 1, wherein the one or more processors are further configured to:
transmit, to the network entity, a hybrid automatic repeat request acknowledgement (HARQ-ACK) via a physical uplink control channel based at least in part on the MAC-CE received from the network entity, wherein the slot offset is an offset to a reference slot associated with a transmission of the HARQ-ACK and a delay, and wherein the delay is based at least in part on a number of slots included in a subframe.

11. The UE of claim 1, wherein the slot offset includes uplink slots and downlink slots.

12. The UE of claim 1, wherein the slot offset includes uplink slots.

13. The UE of claim 1, wherein the MAC-CE activates or deactivates a subset of semi-persistent resources in the semi-persistent resource set.

14. The UE of claim 1, wherein the communication is associated with a transmission of a channel state information (CSI) report from the UE to the network entity.

15. A network entity for wireless communication, comprising:
a memory; and
one or more processors coupled to the memory, the one or more processors configured to:
transmit, to a user equipment (UE) via a physical downlink shared channel, a medium access control control channel (MAC-CE) that indicates one or more of a slot offset or a slot periodicity for a semi-persistent resource set, wherein one or more of the slot offset or the slot periodicity is based at least in part on a first slot in which the MAC-CE is transmitted to the UE; and
perform, with the UE, a communication at a second slot associated with a semi-persistent resource of the semi-persistent resource set based at least in part on one or more of the slot offset or the slot periodicity, wherein the semi-persistent resource associated with the second slot is activated based at least in part on the MAC-CE.

16. A method of wireless communication performed by a user equipment (UE), comprising:
receiving, via a physical downlink shared channel from a network entity, a medium access control control channel (MAC-CE) that indicates one or more of a slot offset or a slot periodicity for a semi-persistent resource set, wherein one or more of the slot offset or the slot periodicity is based at least in part on a first slot in which the MAC-CE is received from the network entity; and
performing, with the network entity, a communication at a second slot associated with a semi-persistent resource of the semi-persistent resource set based at least in part on one or more of the slot offset or the slot periodicity, wherein the semi-persistent resource associated with the second slot is activated based at least in part on the MAC-CE.

17. The method of claim 16, wherein the semi-persistent resource set is associated with a semi-persistent sounding reference signal (SRS) resource set, and wherein the communication is associated with an SRS transmission to the network entity.

18. The method of claim 16, wherein the semi-persistent resource set is associated with a channel state information reference signal (CSI-RS) resource set or a channel state information interference measurement (CSI-IM) resource set, and wherein the communication is associated with a CSI-RS reception from the network entity or a CSI-IM reception from the network entity.

19. The method of claim 16, wherein the semi-persistent resource set is associated with a physical uplink control channel (PUCCH) resource, and wherein the communication is associated with a transmission of a channel state information report to the network entity via the PUCCH resource.

20. The method of claim 16, further comprising:
receiving, from the network entity, a configuration that indicates a plurality of slot offsets and a plurality of slot periodicities, wherein one or more of the slot offset or the slot periodicity indicated by the MAC-CE are included in the configuration.

21. The method of claim 16, wherein one or more of the slot offset or the slot periodicity is an update to one or more of a previously received slot offset or a previously received slot periodicity.

22. The method of claim 16, wherein the MAC-CE indicates the slot offset for each semi-persistent resource included in the semi-persistent resource set, wherein the semi-persistent resource corresponds to a semi-persistent sounding reference signal (SRS) resource, a channel state information reference signal (CSI-RS) resource, or a channel state information interference measurement (CSI-IM) resource.

23. The method of claim 16, wherein the slot offset is an offset to the first slot in which the MAC-CE is received from the network entity.

24. The method of claim 16, further comprising:
transmitting, to the network entity, a hybrid automatic repeat request acknowledgement (HARQ-ACK) via a physical uplink control channel based at least in part on the MAC-CE received from the network entity, wherein the slot offset is an offset to a reference slot in which the HARQ-ACK is transmitted to the network entity.

25. The method of claim 16, further comprising:
transmitting, to the network entity, a hybrid automatic repeat request acknowledgement (HARQ-ACK) via a physical uplink control channel based at least in part on the MAC-CE received from the network entity, wherein the slot offset is an offset to a reference slot associated with a transmission of the HARQ-ACK and a delay, and wherein the delay is based at least in part on a number of slots included in a subframe.

26. The method of claim 16, wherein the slot offset includes uplink slots and downlink slots.

27. The method of claim 16, wherein the slot offset includes uplink slots.

28. The method of claim 16, wherein the MAC-CE activates or deactivates a subset of semi-persistent resources in the semi-persistent resource set.

29. A method of wireless communication performed by a network entity, comprising:
transmitting, to a user equipment (UE) via a physical downlink shared channel, a medium access control control channel (MAC-CE) that indicates one or more of a slot offset or a slot periodicity for a semi-persistent resource set, wherein one or more of the slot offset or the slot periodicity is based at least in part on a first slot in which the MAC-CE is transmitted to the UE; and
performing, with the UE, a communication at a second slot associated with a semi-persistent resource of the semi-persistent resource set based at least in part on one or more of the slot offset or the slot periodicity, wherein the semi-persistent resource associated with the second slot is activated based at least in part on the MAC-CE.

30. The method of claim 16, wherein the communication is associated with a transmission of a channel state information (CSI) report from the UE to the network entity.

\* \* \* \* \*